Apr. 3, 1923.

Re. 15,573

C. E. CHRISTOPHEL

SHEET FEEDING MACHINE

Original Filed Apr. 9, 1919 4 sheets-sheet 1

Carl E. Christophel Inventor,

By Knight Bros

Attorneys,

Apr. 3, 1923. Re. 15,573
C. E. CHRISTOPHEL
SHEET FEEDING MACHINE
Original Filed Apr. 9, 1919 4 sheets-sheet 2
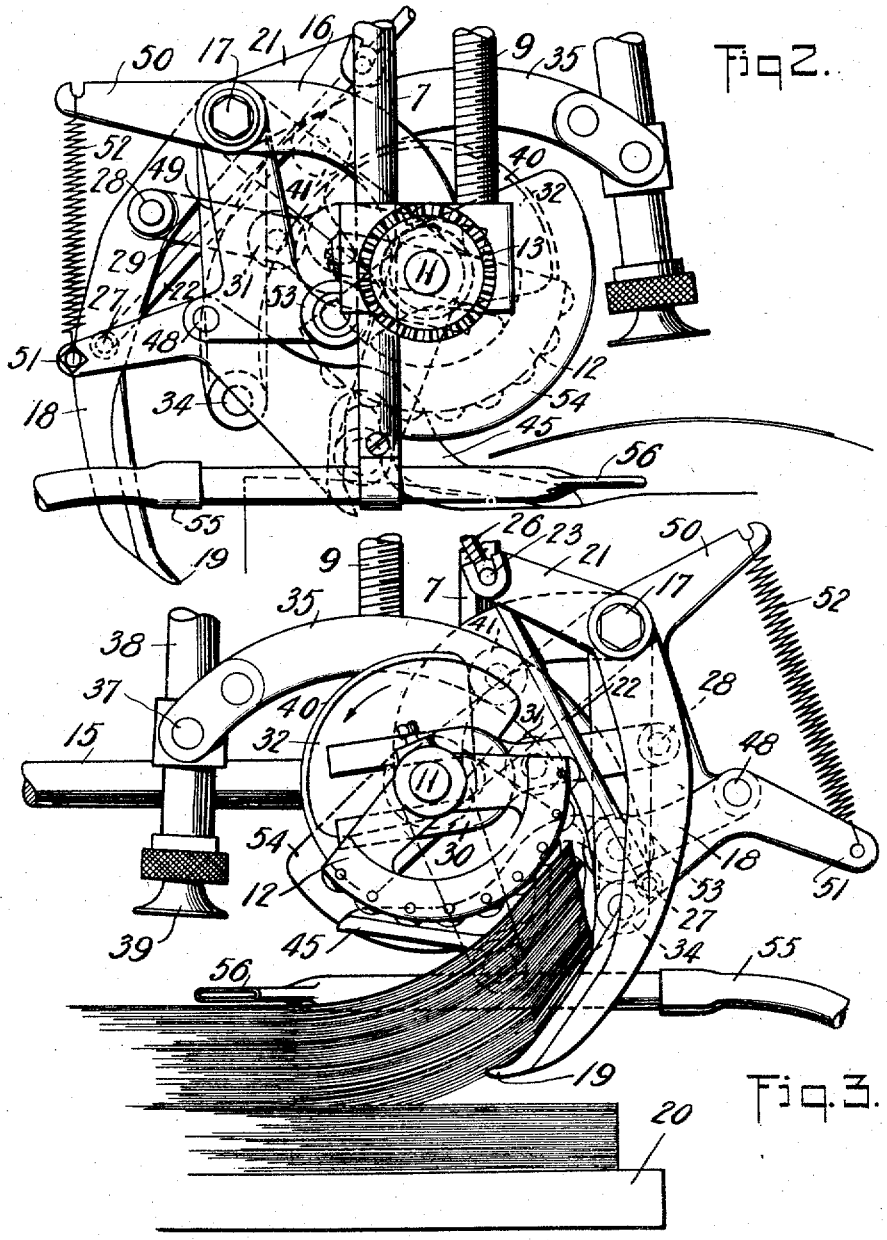
Carl E. Christophel Inventor,
By Knight Bros
Attorneys Apr. 3, 1923. Re. 15,573

C. E. CHRISTOPHEL

SHEET FEEDING MACHINE

Original Filed Apr. 9, 1919 4 sheets-sheet 3

Carl E. Christophel Inventor

By Knight Bros

Attorneys

Apr. 3, 1923. Re. 15,573

C. E. CHRISTOPHEL

SHEET FEEDING MACHINE

Original Filed Apr. 9, 1919 4 sheets-sheet 4

Carl E. Christophel Inventor

By Knight Bros

Attorneys.

Reissued Apr. 3, 1923. Re. 15,573

UNITED STATES PATENT OFFICE.

CARL E. CHRISTOPHEL, OF PEARL RIVER, NEW YORK, ASSIGNOR TO DEXTER FOLDER COMPANY, OF PEARL RIVER, NEW YORK, A CORPORATION OF NEW YORK.

SHEET-FEEDING MACHINE.

Original No. 1,382,952, dated June 28, 1921, Serial No. 288,753, filed April 9, 1919. Application for reissue filed May 18, 1922. Serial No. 562,032.

*To all whom it may concern:*

Be it known that I, CARL E. CHRISTOPHEL, a citizen of Germany, residing at Pearl River, county of Rockland, State of New York, have invented a certain new and useful Improvement in Sheet-Feeding Machines, of which the following is a specification.

This invention relates to sheet feeding machines and has for its object to provide an improved construction and arrangement of parts for adapting machines of this character to operate more rapidly and with greater certainty on sheets which are to be fed one by one from a pile, and especially such an improved sheet feeding mechanism which will be effective on sheets of various kinds including sheets of thin or flimsy paper which ordinarily are difficult to separate from a pile one at a time and which are easily mutilated or mussed.

To this end the present invention comprises, in its broadest aspect, automatically operating movable means for lifting the top sheets of a pile at one point to impart a bend to the lifted sheets, in combination with some form of sheet engaging device cooperating with said movable sheet lifting means to further raise and separate the uppermost sheet from the subjacent sheets in the hollow of the upwardly bent sheets, and means for injecting air beneath said uppermost sheet. The sheet engaging device which cooperates with the movable sheet lifting means may be a sheet straightening device acting upon the raised portions of the sheets for straightening the top sheet across the bend in said lifted sheets, or it may be a sheet gripping device, such as a suction cup, to take hold of the top sheet and raise it in the bend; or there may be a combination of the sheet straightening device, the sheet gripping device and the automatically operating sheet lifting means for accomplishing the desired purpose.

The present invention contemplates further, in its preferred embodiment, a suitably formed lever movable about an axis into and out of position to lift a portion of a pile of sheets, a combing wheel cooperating therewith to impart graded sheet-straightening movements to sheets composing the periodically lifted portion of said pile during the lifting movement, and a sheet gripping sucker movable into and out of position to grip the top sheet.

My invention furthermore contemplates the cooperation of the sheet lifting means with the sheet gripper alone, or the cooperation of the lifting means with the combing wheel alone, for effecting a preliminary separating action, in connection with any suitable mechanism for feeding off the sheets.

The invention further contemplates a construction by means of which the sheet gripping sucker can be so arranged as to be moved into and out of position to operate upon the top sheet of that portion of a pile which has been elevated by the lift lever.

The form and arrangement of the sheet engaging devices, employed one with another or all three together, depend upon the character of the sheets which are being operated upon.

In the drawings:

Figure 2 is a similar side elevation from the opposite side as indicated by the upper arrow in Fig. 6;

Figure 3 is a side elevation similar to Fig. 1 showing the parts in changed positions;

Figure 1:
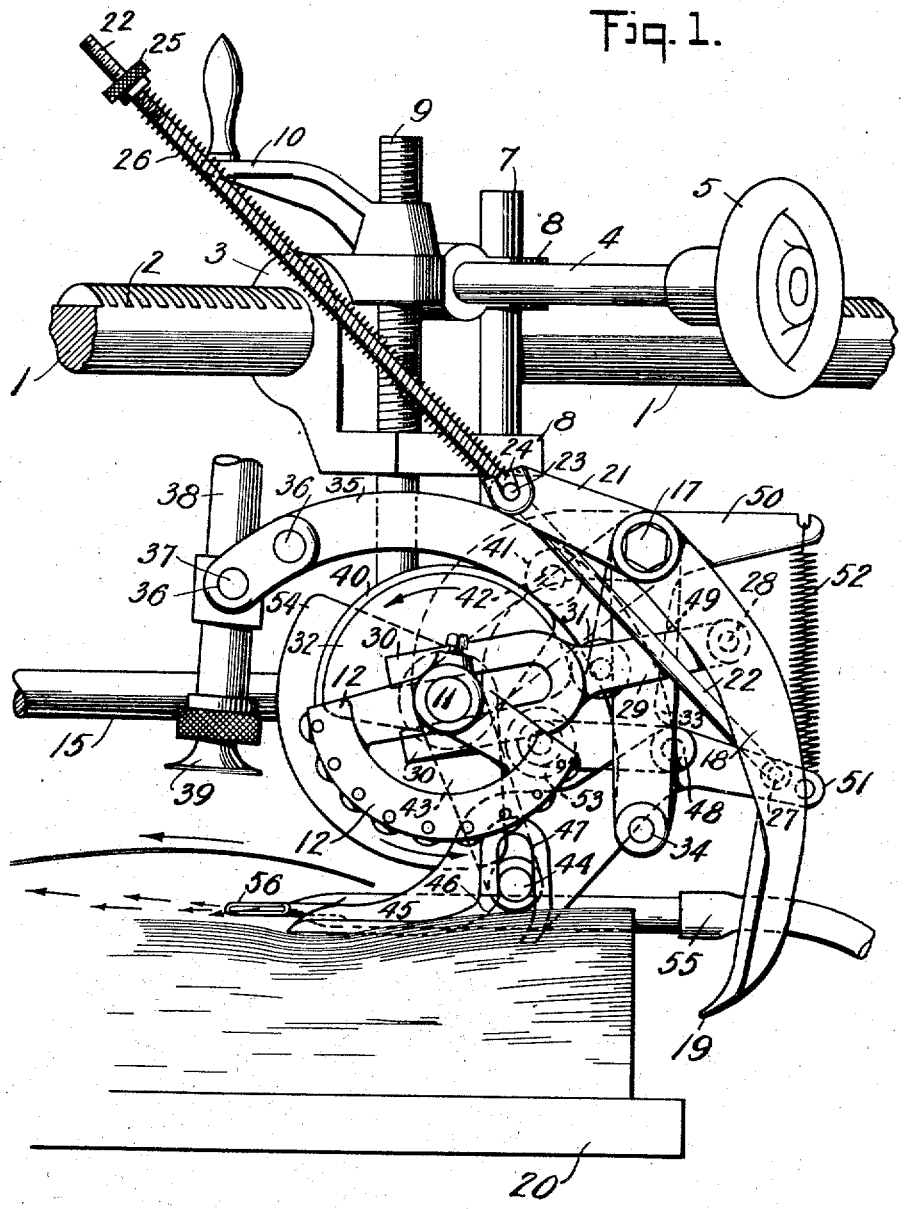
Figure 1 is a side elevation of a preferred embodiment of my invention taken in the direction indicated by the lower arrow on Fig. 6.
Figure 4:
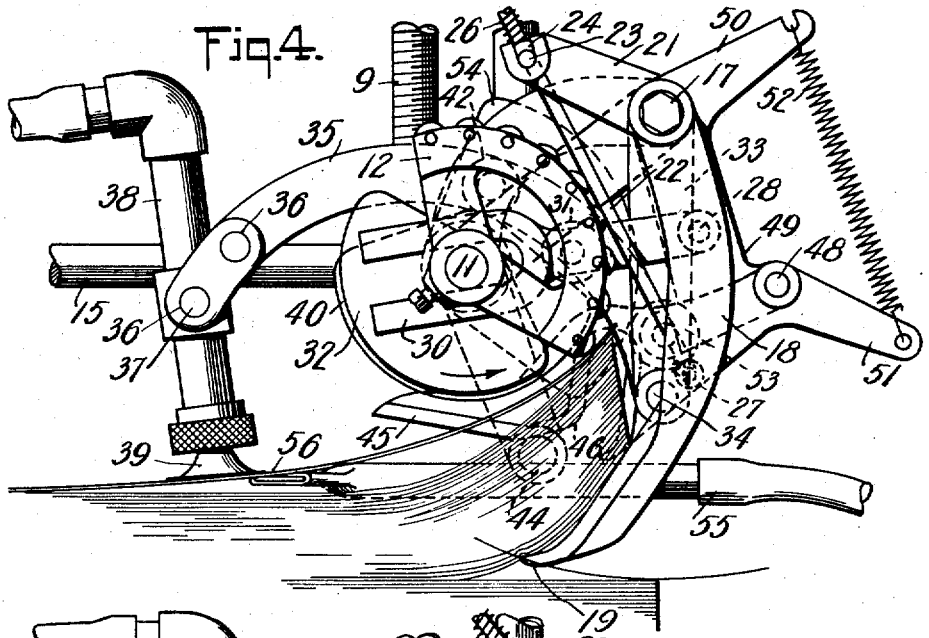
Figure 4 is a similar side elevation showing a more advanced stage of the operation.

In the embodiment of my invention shown on the drawings, a guide shaft 1, provided with a rack 2 serves to carry a bracket 3 which is adapted to be moved along the shaft 1 by means of a pinion (not shown) on the end of a spindle 4 provided with a hand grip 5, said pinion being rotated thereby in mesh with the rack 2.

Figure 6:
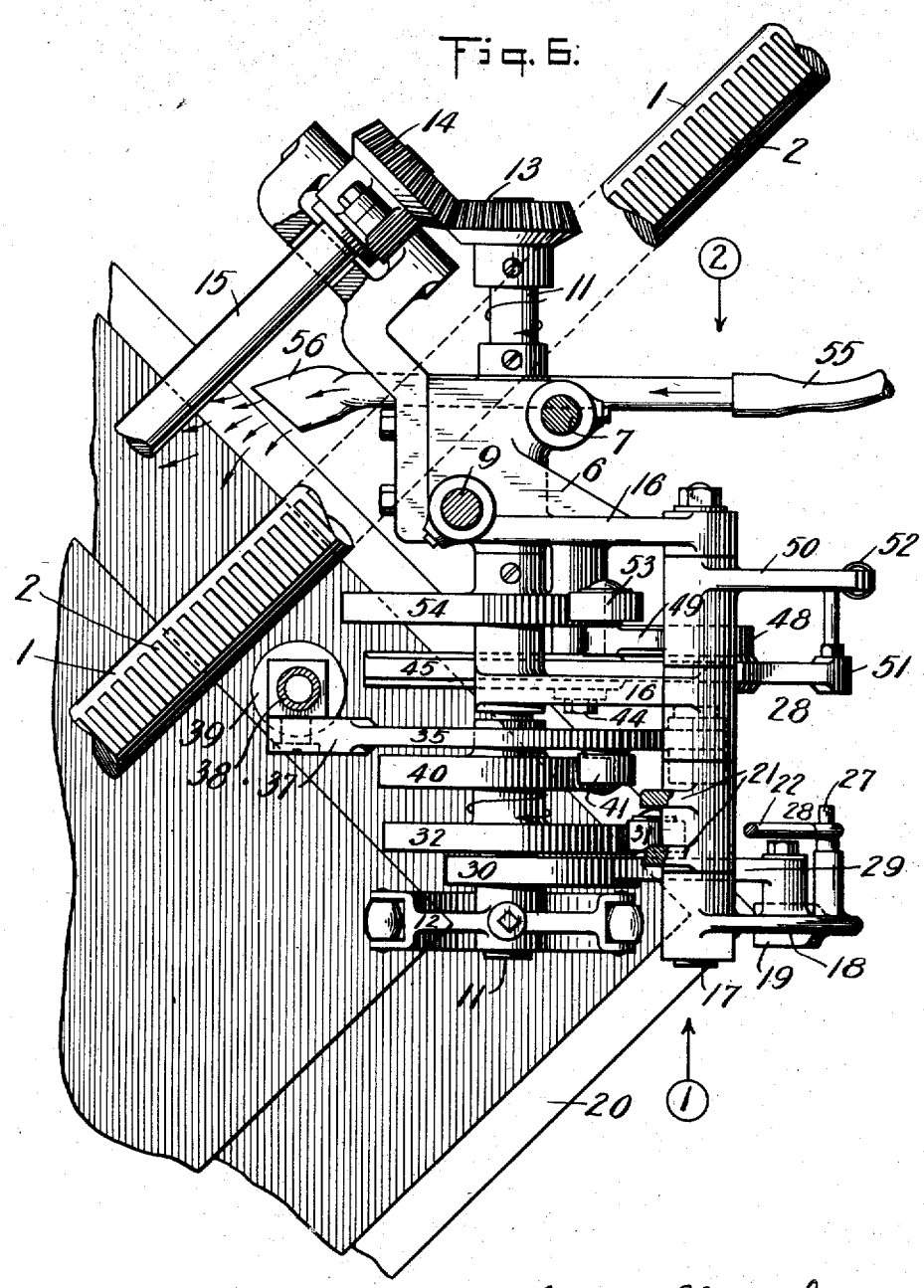
Figure 6 is a top plan view of the mechanism.

In Fig. 6 is shown the main frame 6 of a sheet separating device. Extending upwardly from said frame 6 is a guide rod 7 which slides in the spaced lugs 8 on the bracket 3, shown in Fig. 1. The screw rod 9 also projects upwardly from the frame 6 and likewise extends through the lugs 8 on the bracket 3. Threaded on the upper end of the screw rod 9 is a handle 10 which is adapted to raise and lower the sheet separating device in its entirety.

Journaled in the main frame 6 is a cam shaft 11 to one end of which is secured the combing wheel 12. The other end of said shaft carries a bevel gear 13 which meshes with a similar gear 14 mounted on a power shaft 15. Said drive and cam shaft 11 is thus rotated in the direction of the arrow shown on Fig. 6. It will be seen therefore that the combing instrumentality 12 rotates on a fixed axis above the normal top plane of the pile of sheets.

The frame 6 is provided with rearwardly presented arms 16 which carry a shaft or bolt 17. Pivotally mounted on the shaft or bolt 17 is a lifting lever 18 which roughly conforms in contour to the periphery of the comber 12 when said lever is in operative position with respect to said comber. The lower end of said lever 18 is pointed at 19 to adapt it to be driven into the edge of a pile of sheets on a table 20 (preferably adjacent to the corner of the pile) for momentarily lifting a portion of said pile, and forming an upward bend or hollow in the lifted sheets.

Rigidly secured to the shaft or bolt 17 are spaced forwardly presented bracket arms 21 between which extends a spring rod 22. Pins or trunnions 23 which are journaled upon the arms 21, carry a guide or enlargement 24 in which the rod 22 is slidably mounted. Surrounding the rod 22 and interposed between the guide or enlargement 24 and a thumb nut 25 on the upper end of rod 22, is a spring 26. At its lower end, the rod 22 is connected at 27 to the lift lever 18. It will be seen therefore that the spring 26 tends to throw the lift lever 18 into operating engagement with the pile of sheets. The lift lever 18 carries a pin or stud 28 on which is pivotally mounted one end of a cam lever 29. The other end of said cam lever comprises laterally spaced arms 30 which slidably engage the cam shaft 11. Journaled on the cam lever 29 is a roller 31 which travels on a cam 32 keyed to the cam shaft 11. At each inward movement of lift lever 18, a portion of the pile is lifted in the manner indicated in Fig. 3 into the sphere of action of the combing wheel 12 just in time for said lifted portion of the pile to be operated upon by comber 12.

Depending from the stud or bolt 17 is a bracket arm 33 at the lower end of which is mounted a pin 34 which serves to pivot a curved arm 35 which is provided at its outer enlarged end with a plurality of holes or sockets 36 for the reception of a stud 37 which carries a suction tube 38 provided at its lower end with a sheet gripping sucker 39. Suitable means for moving this sucker into and out of position to grip the top sheet of the pile, is provided by a cam 40 over which travels a roller 41 which is journaled on a pin 42 carried by the lever arm 35.

On the lower end of a depending bracket arm 43 is a laterally projecting guide pin 44 on which slides a clamping foot 45 which is provided with a suitable cam surface 46 and an upwardly extending slot 47 which adapts said clamping foot to move downwardly and upwardly prior to and after each inward and outward movement. The clamp foot 45 is swingingly suspended from a pin 48 carried by a cam lever 49 which pivots on the shaft or bolt 17. Said cam lever 49 is provided with a rearwardly projecting arm 50 between which and a similar arm 51 of the clamping foot 45 extends a spring 52 which tends to draw them together. This spring is thereby adapted to perform a double function, namely, to impart the movements to said clamping foot 45 while at the same time serving to hold a cam roller 53 which is journaled on the cam lever 39, against the cam 54 which serves to govern the movements of these parts.

The usual wind pipe 55 is connected to a nozzle 56 which is suitably presented to provide a blanket of air under the upper sheet after it has been raised by the sucker 39.

The operation of the mechanism will now be readily understood from the following brief description:

According to the relative positions of the parts shown in Figs. 1, 2 and 6, the sucker 39 has a short time before released the preceding top sheet which is being withdrawn from the pile by suitable means not shown on the drawings. The cam roller 41 (which controls the rise and fall of the sucker 39) is soon to be permitted to move to the inner run of cam 40 to pemit the sucker 39 to assume its lowest position in which the next succeeding top sheet will be drawn into engagement therewith. On the other hand the clamping foot 45 is about to be shifted toward the right and lifted by means of the cam 54 which moves the cam roller 53 into its extreme right hand position according to Fig. 1. At the same time, the lifting lever 18 is about to be thrown into the position shown in Fig. 3 by reason of cam roller 31 being released by cam 32 to assume its extreme left hand position. As shown in Fig. 3, clamping foot 45 has been lifted by cam roller 53 being forced to the outer run of cam 54, while the lifting lever 18 has displaced upwardly and momentarily supported a portion of the pile (in the present instance one corner) in position to have the comber 12 operate on the top sheets. According to Fig. 3, the sucker is moving downward as the comber 12 begins its action upon the top sheets. By the time sucker 39 has reached its lowest position as shown in Fig.

Figure 5:
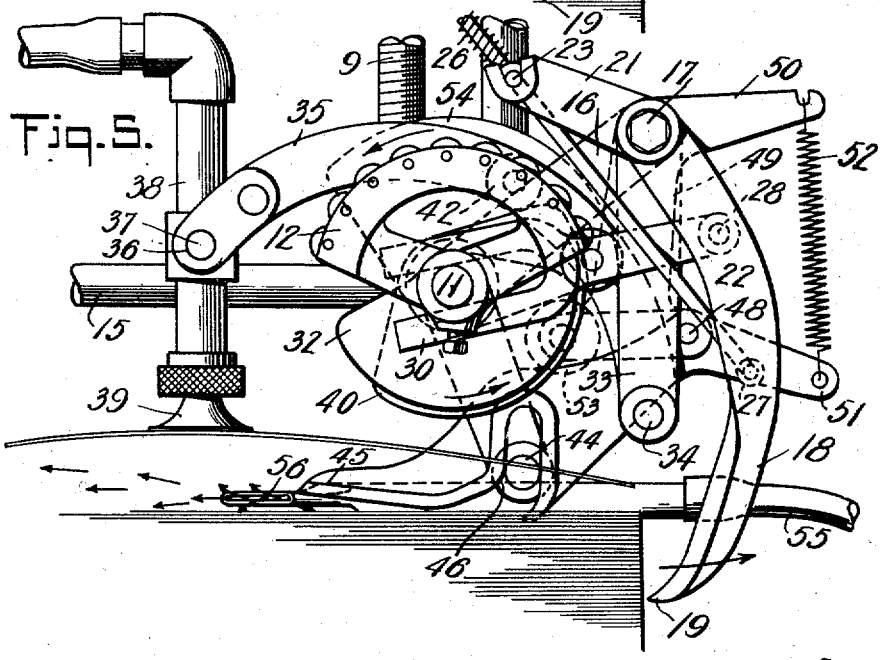
Figure 5 is a similar side elevation showing the final phase of the operation.

4, the top sheet of the lifted portion of the pile has been straightened across the bend or hollow of the up-turned sheets by the action of the comber, and thereby raised slightly into a suitable position to be gripped by sucker 39. Immediately afterward, the cam roller 31 is forced to the outer run of cam 32 to throw the lift lever 18 away from the pile as shown in Fig. 5. At the same time, the clamping foot 45 has moved forward and downward, brushing beneath the raised edge of the top sheet during the sucker's rising movement which is occasioned by cam roller 41 being forced to the outer run of cam 40. Blasts of air are delivered from nozzles 56 beneath the top sheet as the separating action is completed. The parts are next moved into the relative positions shown in Figs. 1, 2 and 6, the separated top sheet being released by the sucker and passed forwardly from the machine. The successive operations are thus produced in the sequence pointed out above.

The improved sheet separating device is designed primarily for use as a preliminary separator in an automatic sheet feeding machine, having a pile elevating table and suitable feeding-off and delivery devices for conveying sheets to printing presses and other machines designed to operate upon them. The improved separator may be used as a single unit when operating upon certain sizes of sheets, but when operating upon sheets of large size it will, of course, be understood that two of the improved separators are employed to act simultaneously upon the rear corners of the pile in accordance with the common practice of operating automatic feeding machines.

As heretofore stated the improved separator may be used with either or both of the sheet engaging devices, depending upon the character of the stock operated upon. When employing the sheet elevating means with only the sheet straightening combing device, the sheet gripping sucker can be held out of action by its adjusting devices. With some kinds of paper stock the action of the sheet comber upon the raised portions of the sheets is sufficient to permit the introduction of a blanket of air beneath the top sheet to completely separate it without the assistance of the suction gripper. Likewise with certain kinds of stock the action of the sheet elevating means causes a sufficient separation of the top sheet in the hollow of the upbent portions of sheets to enable the suction gripper to take hold of the top sheet and complete the separation without the assistance of the combing device.

I claim:

1. In a sheet feeding machine, a sheet gripping instrumentality, means for supporting a pile of sheets and holding one portion of said pile displaced relatively to other portions of said pile, and means operating upon the top sheet of said pile in a direction away from said sheet gripping instrumentality for moving said top sheet into position to be engaged by said sheet gripping instrumentality.

2. In a sheet feeding machine, a sheet gripping instrumentality, means for supporting a pile of sheets and holding one portion of said pile displaced relatively to other portions of said pile, and means operating upon the displaced portion of the top sheet of said pile in a direction away from said sheet gripping instrumentality and moving said top sheet into position to be engaged by said sheet gripping instrumentality.

3. In a sheet feeding machine, a sheet gripping instrumentality, means for supporting a pile of sheets, means for displacing one portion of said pile relatively to another, and means operating upon the top sheet of said pile in a direction away from said sheet gripping instrumentality and intermediately of said sheet gripping instrumentality and said displacing means for moving said top sheet into position to be engaged by said sheet gripping instrumentality.

4. In a sheet feeding machine, a pile supporting table, means for imparting a bend to a portion of said pile, a sheet gripping instrumentality, means for straightening the top sheet of said pile across said bend for moving it into a position to be gripped by said instrumentality, and means for introducing a blanket of air beneath said top sheet.

5. In a sheet feeding machine, a pile holding table, means for lifting a portion of said pile, a sheet gripping instrumentality arranged above a pile of sheets on said table, and means operating on the top sheet of said pile in a direction away from said sheet gripping instrumentality for straightening said top sheet and moving it nearer said sheet gripping instrumentality.

6. In a sheet feeding machine, the combination with a pile holding table, of a sucker and means for lifting a portion of a pile of sheets from said table and toward said sucker, and a sheet combing instrumentality operating on the lifted portion of said pile for drawing out the top sheet into position to be engaged by said sucker.

7. In a sheet feeding machine, a pile holding table, means for lifting a portion of said pile, a sheet gripping instrumentality arranged above a pile of sheets on said table, and sheet combing means operating on the top sheet of said pile in a direction away from the said sheet gripping instrumentality for straightening said top sheet and moving it nearer said sheet gripping instrumentality.

8. In a sheet feeding machine, a pile holding table, means for lifting a portion of said pile, a sheet gripping instrumentality arranged above a pile of sheets on said table, and sheet combing means operating on the top sheet of said pile in a direction away from said sheet gripping instrumentality for straightening said top sheet and moving it nearer said sheet gripping instrumentality, said lifting means including a lever movable about an axis into and out of position to hold said lifted portion of the pile in momentary engagement with said sheet combing means.

9. In a sheet feeding machine, the combination with a table for holding a pile of sheets, of sheet separating mechanism including a sucker, a combing wheel journaled on an axis above said table and having its operating periphery normally spaced from a pile of sheets on said table, and a lifting lever movable into and out of position to raise a portion of said pile into operating engagement with said combing wheel.

10. In a sheet feeding machine, the combination with a table for holding a pile of sheets, of sheet separating mechanism including a sucker, a combing wheel journaled on an axis above said table and having its operating periphery normally spaced from a pile of sheets on said table, and a lifting lever movable into and out of position to raise a portion of said pile into operating engagement with said combing wheel, said lifting lever being shaped to conform approximately to the periphery of said combing wheel.

11. In a sheet feeding machine, a pile supporting table, a lifting lever suitably mounted for lifting a corner of a pile of sheets on said table, a sheet gripping sucker movable toward and away from said pile of sheets and a combing wheel arranged above said pile of sheets and between said sucker and said lifting lever.

12. In a sheet feeding machine, a pile holding table, a lever for lifting a portion of said pile, a sheet gripping instrumentality arranged above a pile of sheets on said table, means for moving said lever and sheet gripping instrumentality alternately toward and away from each other, and a combing wheel arranged between said lifting lever and sheet gripping instrumentality.

13. In a sheet feeding machine, a table for holding a pile of sheets, a combing instrumentality adapted to operate on a portion of said pile of sheets when it is raised above the upper surface of said pile, and a lifting lever movable into and out of position to lift a portion of said pile into position to be engaged by said combing instrumentality.

14. In a sheet feeding machine, a table for holding a pile of sheets, a pile comber rotatable on a fixed axis above said table, means for momentarily lifting a portion of a pile of sheets into and out of engagement with said pile comber for effecting a preliminary separation, and means movable into and out of gripping engagement with the lifted portion of the separated upper sheet for removing said sheet.

15. In a sheet feeding machine, a table for holding a pile of sheets, a rotary pile comber arranged above said table, a lever suitably formed and movable into and out of position to lift a portion of said pile into position to be engaged by said comber, and a sheet engaging sucker movable into and out of position to engage the lifted portion of the top sheet.

16. In a sheet feeding machine, a table for holding a pile of sheets, a rotary pile comber arranged above said table, a lever suitably formed and movable into and out of position to lift a portion of said pile into position to be engaged by said comber, and a sheet engaging sucker movable into and out of position to engage the lifted portion of the top sheet, said sucker and lifting lever being movable toward said rotary comber from opposite sides thereof.

17. In a sheet feeding machine, a sheet engaging instrumentality having a sphere of action spaced above the top surface of a pile of sheets, means for lifting a portion of said pile into the sphere of action of said sheet engaging instrumentality, and sheet gripping means movable into and out of position to grip a sheet which has been displaced by said sheet engaging instrumentality.

18. In a sheet feeding machine, a sheet gripper movable into and out of sheet gripping position above a pile of sheets, means for displacing portions of some of the sheets of said pile relatively to other portions of the same sheets, and means operating on the displaced portion of the top sheet for moving a portion of said top sheet into position to be engaged by said sheet gripper in sheet gripping position, said displacing means and said top sheet moving means being movable into and out of cooperating relation to each other and on opposite sides of the lifted portion of said sheets.

19. In a sheet feeding machine, a sheet gripper movable into and out of its lowermost position above a pile of sheets, means for lifting a portion of said pile adjacent to said gripper in its lowermost position, and a sheet combing device operating upon the lifted portion of the top sheet of said pile for drawing said top sheet into position to be engaged by said sheet gripper.

20. In a sheet feeding machine, the combination of a support for a pile of sheets, with automatically operating movable means for lifting the top sheets of a pile at one point to impart a bend to the lifted sheets, a sheet engaging device cooperating with said sheet lifting means to further raise and separate the uppermost sheet from the subjacent sheets in the hollow of the upwardly bent sheets, and means for injecting air beneath said uppermost sheet.

21. In a sheet separating mechanism, the combination of automatically operating means for elevating and supporting the top sheets of a pile at one edge, and sheet straightening means cooperating therewith and engaging the elevated portion of the topmost sheet to straighten the same.

22. In a sheet separating mechanism, the combination of automatically operating means for elevating and supporting the top sheets of a pile at one edge, and a rotary sheet straightening device cooperating therewith and engaging the elevated portion of the topmost sheet to straighten the same.

23. In a sheet feeding machine, the combination of a support for a pile of sheets, automatically operating movable means for lifting the top sheets of the pile at one point to impart a bend to the lifted sheets, a sheet straightening device cooperating with said lifting means to straighten the uppermost sheet across said bend, and means for injecting air beneath the straightened lifted sheet.

24. In a sheet feeding machine, a pile supporting table, automatic means for imparting a bend to a portion of said pile, rotary means for straightening the top sheet of said pile across said bend for partially separating the top sheet from the subjacent sheets, and means for introducing a blanket of air beneath said top sheet.

25. In a sheet feeding machine, a pile supporting table, automatic means for imparting a bend to a portion of said pile, sheet combing means for straightening the top sheet of said pile across said bend for partially separating the top sheet from the subjacent sheets, and means for introducing a blanket of air beneath said top sheet.

26. In a device of the character described, the combination of a sheet gripper, means for elevating and lowering the same, means for holding one edge of the sheet elevated, a rotary combing wheel, and means rotating the same outwardly toward the edge of the pile whereby the topmost sheet is straightened and engaged with said gripper.

27. In a sheet feeding machine, a table for holding a pile of sheets, a combing instrumentality adapted to operate on a portion of said pile of sheets when it is raised above the upper surface of said pile, and automatic means for lifting and supporting a portion of said pile in position to be engaged by said combing instrumentality.

28. In a sheet feeding machine, the combination of a pile supporting table, a lifting lever suitably mounted for lifting a corner of a pile of sheets on said table, and a combing wheel arranged to operate upon the lifted corners of the sheets.

CARL E. CHRISTOPHEL.